(12) United States Patent
Ott et al.

(10) Patent No.: US 11,175,461 B2
(45) Date of Patent: Nov. 16, 2021

(54) FIBER ALIGNMENT DEVICE WITH CURVED PORTIONS

(71) Applicant: COMMSCOPE TECHNOLOGIES LLC, Hickory, NC (US)

(72) Inventors: Michael J. Ott, Hudson, WI (US); Steven C. Zimmel, Minneapolis, MN (US); Robert Charles Flaig, Lancaster, PA (US); Danny Willy August Verheyden, Kessel-Lo (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/980,633

(22) PCT Filed: Mar. 13, 2019

(86) PCT No.: PCT/US2019/021978
§ 371 (c)(1),
(2) Date: Sep. 14, 2020

(87) PCT Pub. No.: WO2019/178181
PCT Pub. Date: Sep. 19, 2019

(65) Prior Publication Data
US 2021/0018695 A1 Jan. 21, 2021

Related U.S. Application Data

(60) Provisional application No. 62/642,770, filed on Mar. 14, 2018.

(51) Int. Cl.
*G02B 6/38* (2006.01)

(52) U.S. Cl.
CPC .................................. *G02B 6/3809* (2013.01)

(58) Field of Classification Search
None
See application file for complete search history.

(56) References Cited

U.S. PATENT DOCUMENTS

| 4,057,448 A * | 11/1977 | Miller | B65H 69/06 156/158 |
| 4,341,439 A * | 7/1982 | Hodge | G02B 6/3842 385/54 |
| 4,506,946 A * | 3/1985 | Hodge | G02B 6/3809 385/64 |

(Continued)

FOREIGN PATENT DOCUMENTS

| DE | 3833369 A1 * | 4/1990 |
| JP | 56-19017 A * | 2/1981 |

(Continued)

OTHER PUBLICATIONS

International Search Report and Written Opinion of the International Searching Authority for International Patent Application No. PCT/US2019/021978 dated Jul. 3, 2019, 9 pages.

*Primary Examiner* — Michael Stahl
(74) *Attorney, Agent, or Firm* — Merchant & Gould P.C.

(57) ABSTRACT

Aspects and techniques of the present disclosure relate to a fiber alignment device that includes curved-type alignment bores. Another aspect of the present disclosure relates to methods of forming the fiber alignment device with curved-type alignment bores.

19 Claims, 19 Drawing Sheets

(56) References Cited

U.S. PATENT DOCUMENTS

| | | | |
|---|---|---|---|
| 4,647,150 A * | 3/1987 | DeSanti | G02B 6/3801 385/98 |
| 4,964,689 A * | 10/1990 | Wichansky | G02B 6/255 156/158 |
| 5,469,522 A * | 11/1995 | Fan | G02B 6/3801 385/72 |
| 8,870,466 B2 | 10/2014 | Lu | |
| 9,575,263 B2 | 2/2017 | Gurreri et al. | |
| 2004/0175073 A1 | 9/2004 | Grinderslev et al. | |
| 2011/0235976 A1 | 9/2011 | Lu | |
| 2013/0183001 A1 | 7/2013 | Ott | |
| 2017/0254967 A1 | 9/2017 | Lu et al. | |
| 2017/0343738 A1 | 11/2017 | Kobyakov et al. | |

FOREIGN PATENT DOCUMENTS

| | | |
|---|---|---|
| WO | 2012/112344 A1 | 8/2012 |
| WO | 2013/117598 A2 | 8/2013 |

* cited by examiner

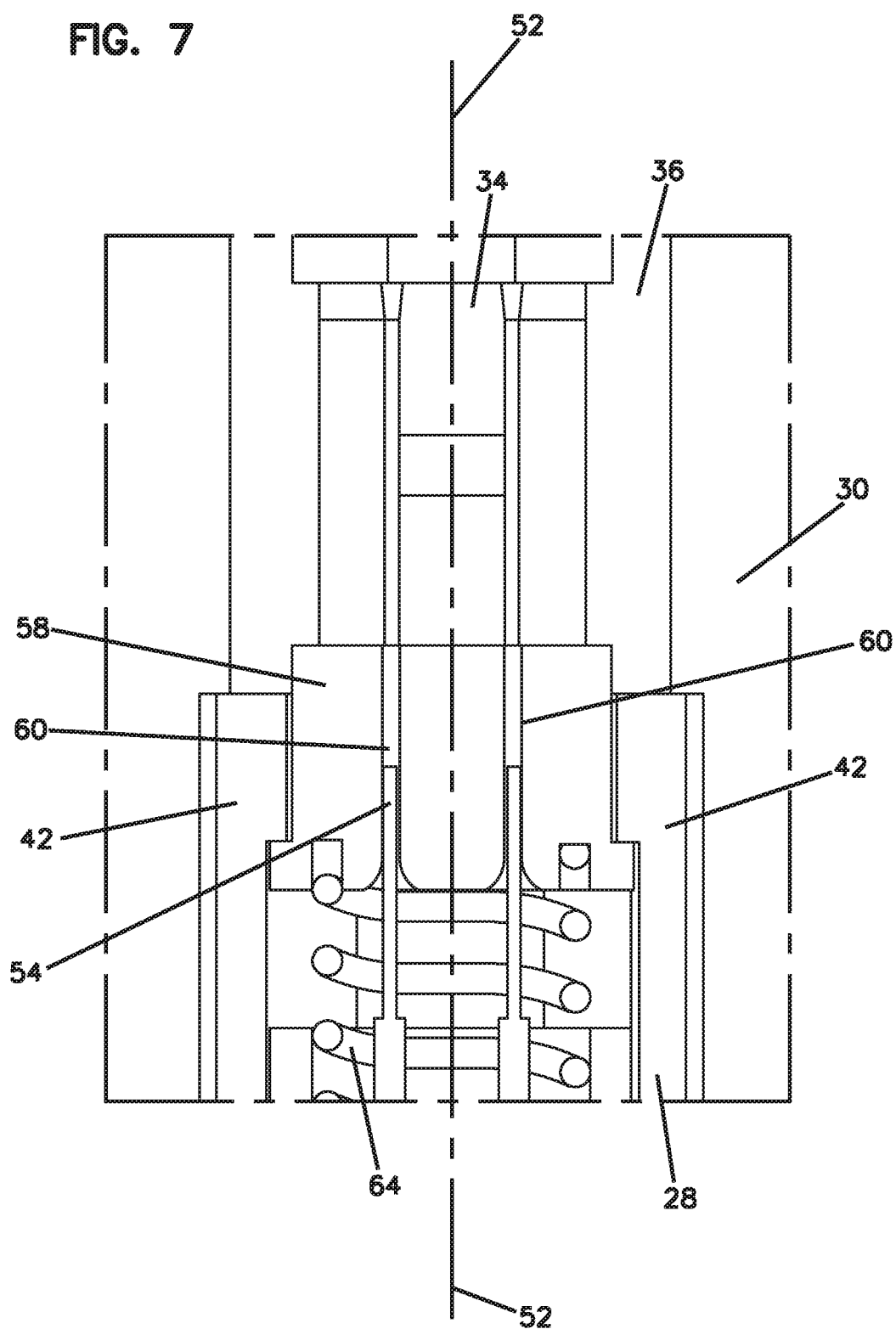

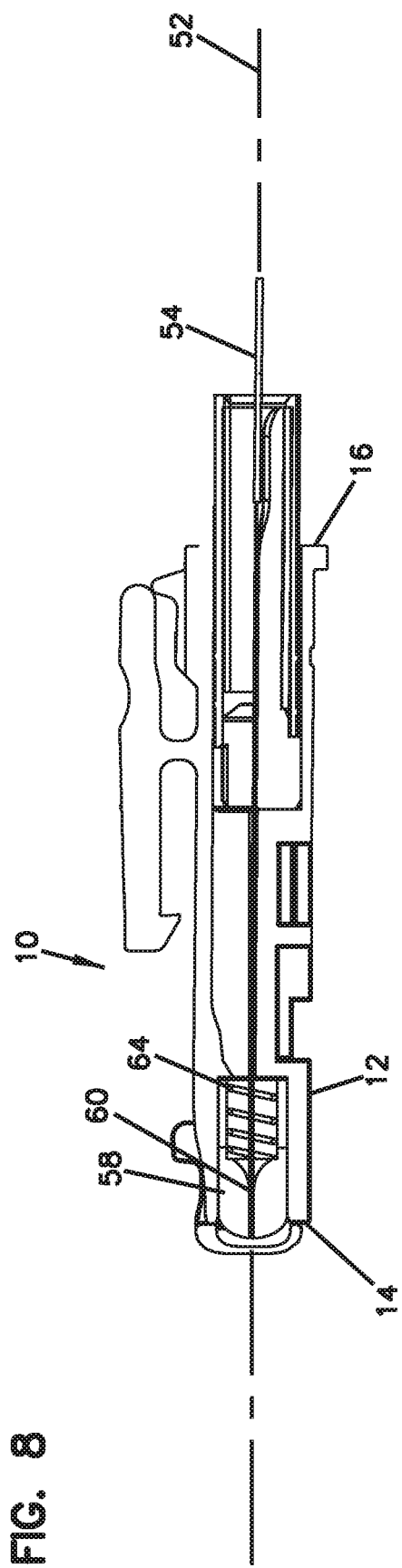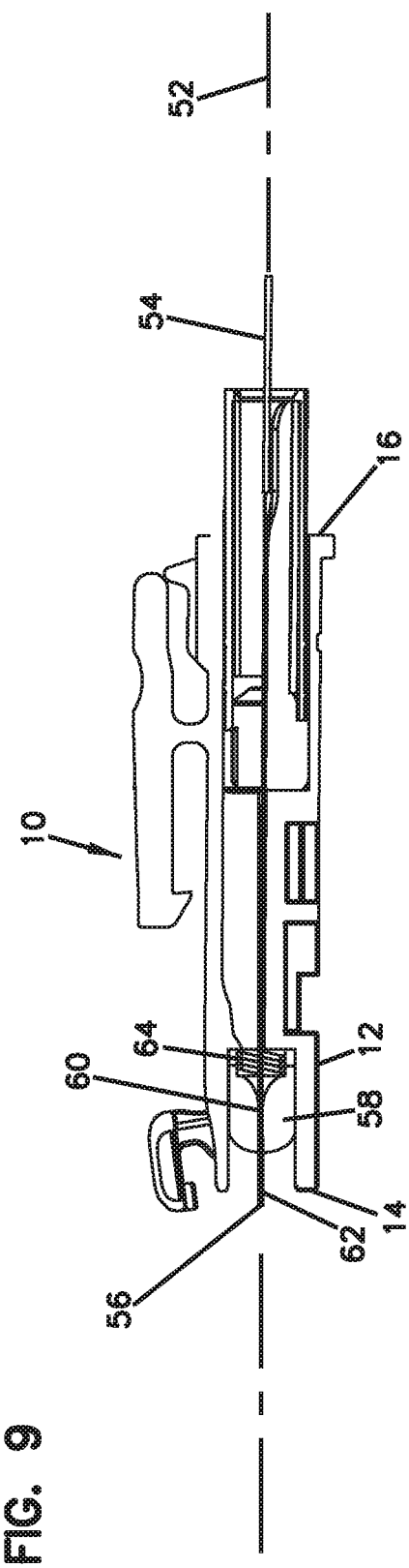

FIBER ALIGNMENT DEVICE WITH CURVED PORTIONS

CROSS-REFERENCE TO RELATED APPLICATION

This application is a National Stage Application of PCT/US2019/021978, filed on Mar. 13, 2019, which claims the benefit of U.S. patent application Ser. No. 62/642,770, filed on Mar. 14, 2018, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to devices and methods for aligning optical fibers.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Example ferrule-less fiber optic connectors are disclosed by PCT Publication No. WO 2012/112344; PCT Publication No. WO 2013/117598; and U.S. Pat. No. 8,870,466.

Fiber optical adapters are used to optically couple together optical fiber tips of optical connectors. Fiber optical adapters can include specialized fiber alignment devices to receive bare optical fibers and align the fiber tips to enable the transfer of optical signals therebetween. Optical connectors can be secured to the optical adapters when received at the ports of the optical adapters. Improvements are needed in the area of fiber alignment for multi-fiber fiber optic connectors.

SUMMARY

One aspect of the present disclosure relates to a fiber alignment device. Although a multi-fiber alignment device is described herein, the advantages and features of the present disclosure can also relate to a single fiber alignment device.

Another aspect of the present disclosure relates to a fiber alignment device that includes a one piece alignment body that has a first end and an opposite second end. An alignment bore can extend between the first and second ends of the one piece alignment body. The one piece alignment body can define and fully encircle the fixed sized alignment bore. The fiber alignment device can also include an intermediate region positioned between the first and second ends of the one piece alignment device. The fixed sized alignment bore can have first and second curved portions located on opposite sides of the intermediate region.

Another aspect of the present disclosure relates to a multi-fiber alignment device that includes a one piece alignment body that has a first end and an opposite second end. A plurality of alignment bores can extend between the first and second ends of the one piece alignment body. The one piece alignment body can define and fully encircle each one of the plurality of alignment bores. The multi-fiber alignment device can also include an intermediate region positioned between the first and second ends of the one piece alignment device. Each one of the plurality of alignment bores can have first and second curved portions located on opposite sides of the intermediate region.

A further aspect of the present disclosure relates to a method of forming a fiber alignment device. The method can include a step of molding an alignment bore that extends between first and second ends of a one piece alignment body. The one piece alignment body fully encircling the fixed sized alignment bore. The method can include a step of unevenly cooling the one piece alignment body to cause the alignment bore to bend.

A further aspect of the present disclosure relates to a method of forming a fiber alignment device that includes a step of placing at least one insert pin into a mold such that the at least one insert pin is curved within the mold. The method can include a step of injecting a molding material into the mold such that the molding material fully encircles the at least one insert pin to form a one piece alignment body. The one piece alignment body can have at least one curved bore that corresponds to the curvature of the at least one insert pin. The method can include a step of pulling the at least one insert pin out of the mold.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 illustrates a cross-sectional view of a portion of the ferrule-less fiber optic connector shown in FIG. 6;

FIG. 8 is a cross-sectional view showing the ferrule-less fiber optic connector shown in FIG. 1, the fiber optic connector is shown with a shutter in a closed position and a nose piece in an extended position;

FIG. 9 illustrates the ferrule-less fiber optic connector of FIG. 8 with the shutter in an open position and the nose piece in a retracted position;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

As used herein, a "ferrule" is a relatively hard structure adapted to receive and support an optical fiber near the end or at the end of the optical fiber. A ferrule is typically adapted to assist in providing alignment of an optical fiber with a corresponding optical fiber of a mated fiber optic connector. In the case of single-fiber ferrules, such ferrules are often cylindrical and often have a construction made of ceramic or of relatively hard plastic. Examples of these types of ferrules can include SC ferrules and LC ferrules. Ferrules can also include multi-fiber ferrules that receive and support a plurality of optical fibers. An example multi-fiber ferrule can include an MPO ferrule.

Figure 1:
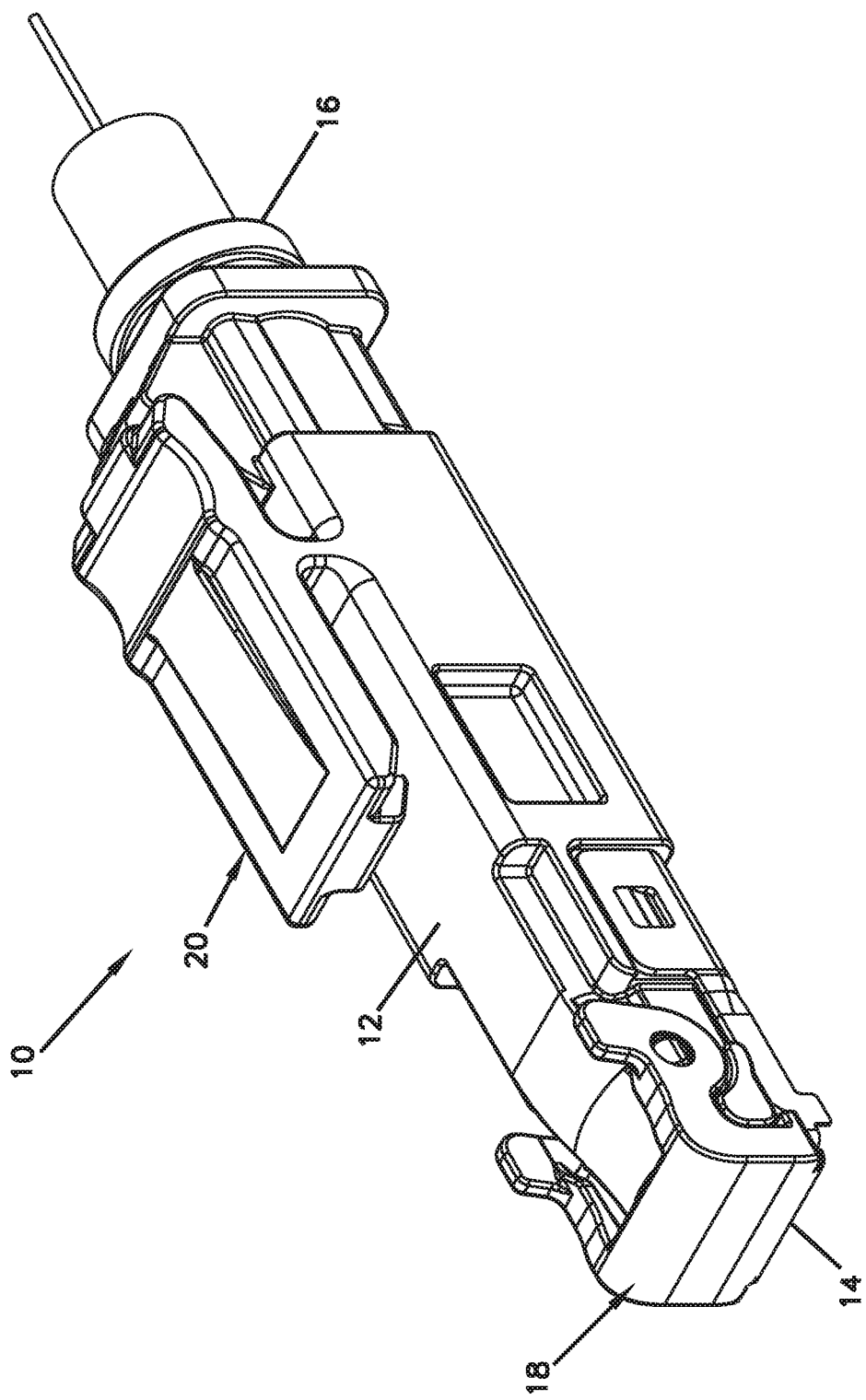
FIG. 1 illustrates a prior art ferrule-less fiber optic connector.

Optical connectors can include ferrule-less optical connectors. For example, an example ferrule-less optical connector 10 known in the art is shown at FIG. 1. The optical connector 10 includes a connector body 12 having a front mating end 14 and a rear cable terminating end 16. An optical fiber extends forwardly through the connector body 12 and has a ferrule-less end portion that is accessible at the front mating end 14 of the connector body 12. The optical fiber is anchored adjacent the rear cable terminating end 16 against axial movement relative to the connector body 12. When two optical connectors 10 are coupled together, the end faces of the ferrule-less end portions abut one another, thereby causing the optical fibers to be forced rearwardly into the connector bodies 12 and to buckle/bend within fiber buckling regions of the connector bodies 12. A shutter 18 moves between closed and open positions. The shutter 18 protects the ferrule-less end portion of the optical fiber from contamination when shut and allows access to the ferrule-less end portion when open.

Figure 2:
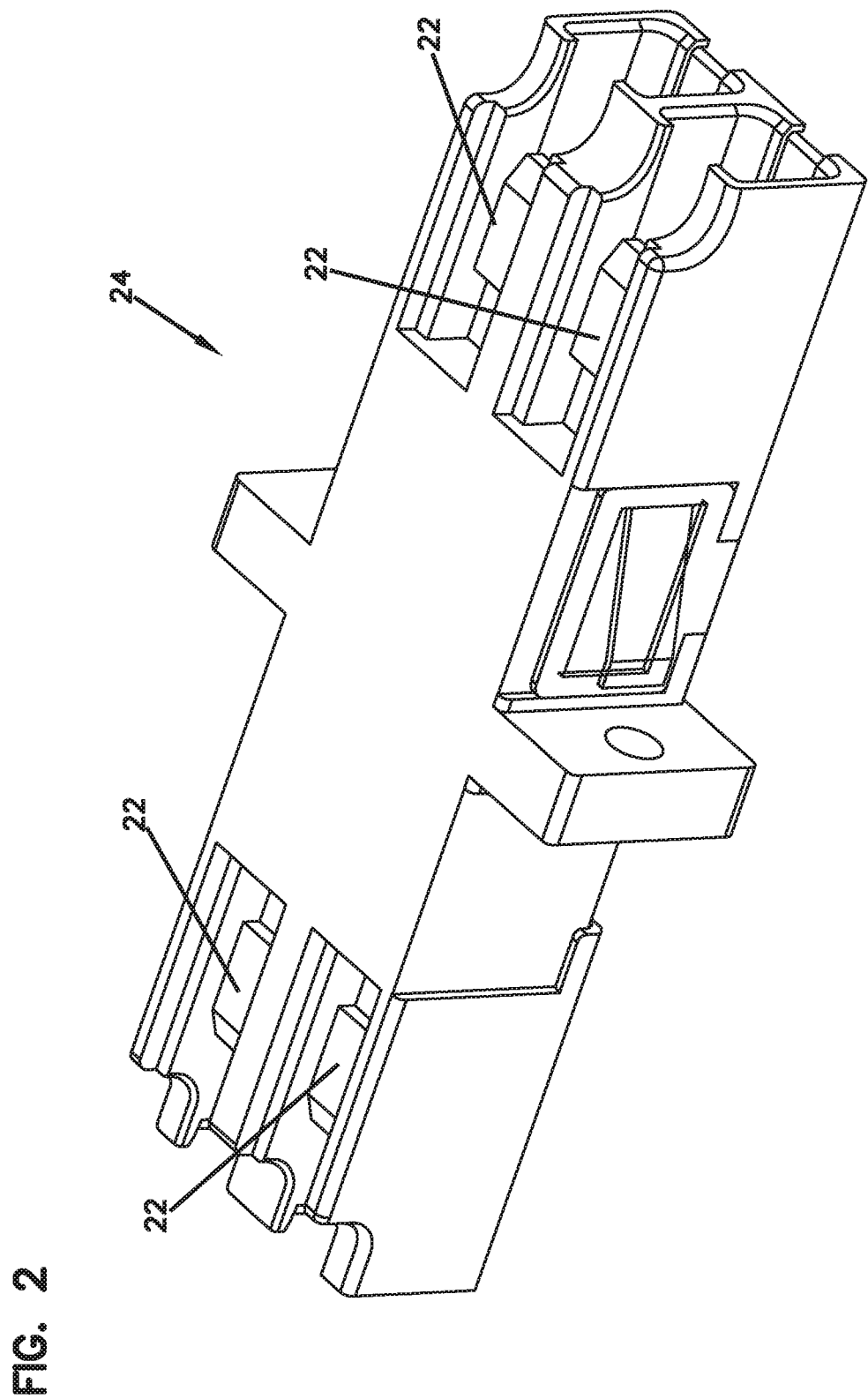
FIG. 2 illustrates a prior art fiber optic adapter compatible with the ferrule-less fiber optic connector of FIG. 1.

The optical connector 10 also includes a latch 20 that engages a catch 22 of a fiber optic adapter 24 (see FIG. 2). The latch 20 includes a resilient cantilever style latch. When the optical connectors 10 are inserted within the coaxially aligned ports of the adapter 24, the shutters 18 of the optical connectors 10 are retracted, thereby exposing the ferrule-less ends of the optical fibers. Continued insertion causes the ferrule-less ends to enter an optical fiber alignment device. Other examples of ferrule-less optical connectors and corresponding optical adapters can be found in U.S. patent application Ser. No. 14/377,189, filed Aug. 7, 2014, and titled "Optical Fiber Connection System Including Optical Fiber Alignment Device," the disclosure of which is incorporated herein by reference.

Figure 3:
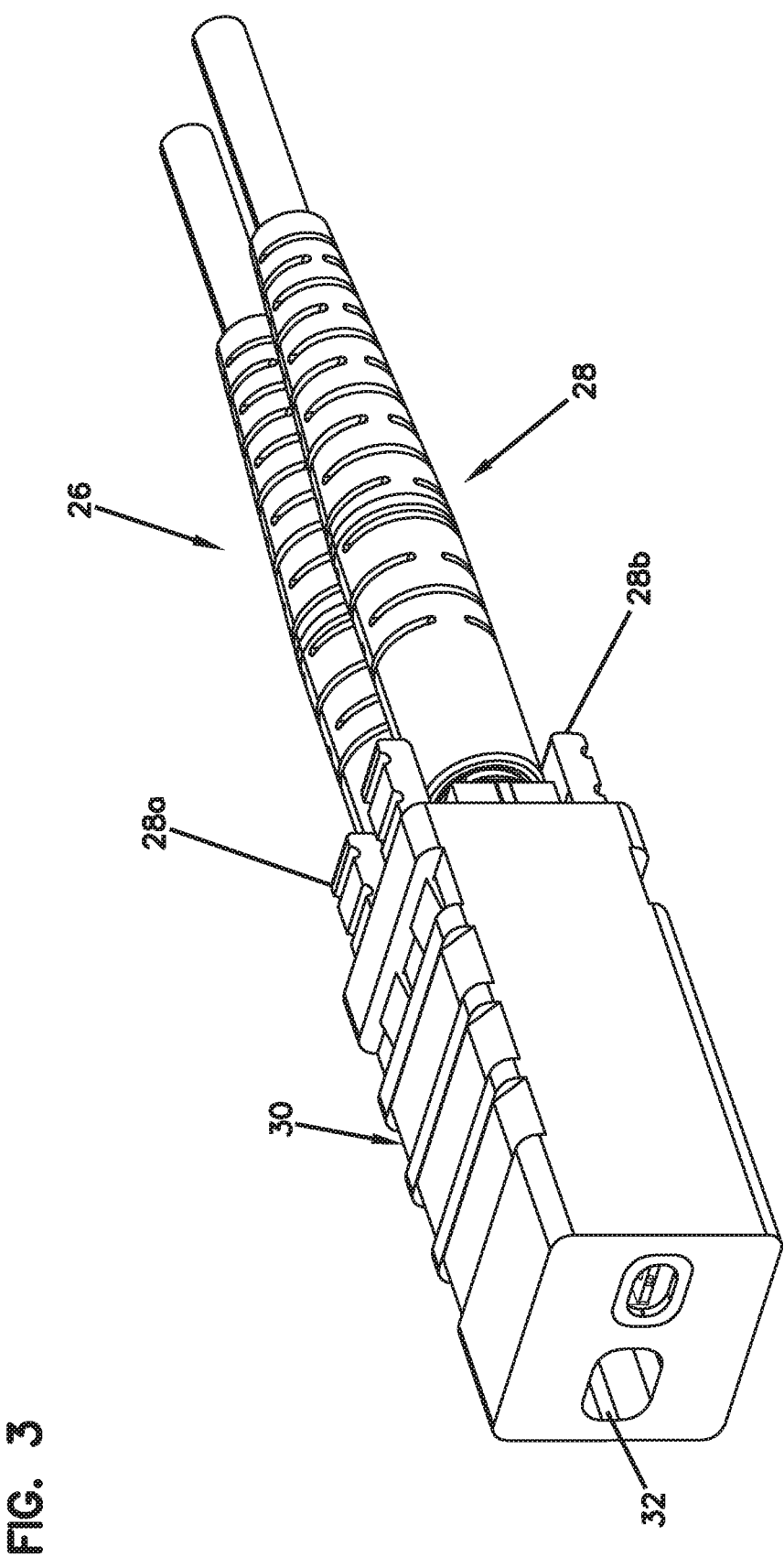
FIG. 3 illustrates a ferrule-less fiber optic connection system in accordance with the principles of the present disclosure, the system shows a duplex fiber optic connector positioned within an intermediate fiber optic adapter for mating the duplex fiber optic connector with another duplex fiber optic connector; in accordance with the principles of the present disclosure.

FIG. 3 shows a fiber optic connection system 26 in accordance with the principles of the present disclosure. The fiber optic connection system 26 includes a duplex fiber optic connector 28 and a fiber optic adapter 30. The duplex fiber optic connector 28 is depicted as a ferrule-less fiber optic connector. The fiber optic adapter 30 includes adapter ports 32 for receiving the duplex fiber optic connector 28. In the depicted example of FIG. 3, the duplex fiber optic connectors 28a and 28b are shown loaded within respective adapter ports 32 of the fiber optic adapter 30. The duplex fiber optic connectors 28a and 28b are respectively adapted to be optically and mechanically coupled to another one of a duplex fiber optic connector (not shown). It will be appreciated that the duplex fiber optic connectors 28a and 28b can have identical configurations and therefore the general reference number 28 is applicable to each of the duplex fiber optic connectors 28a and 28b.

Figure 4:
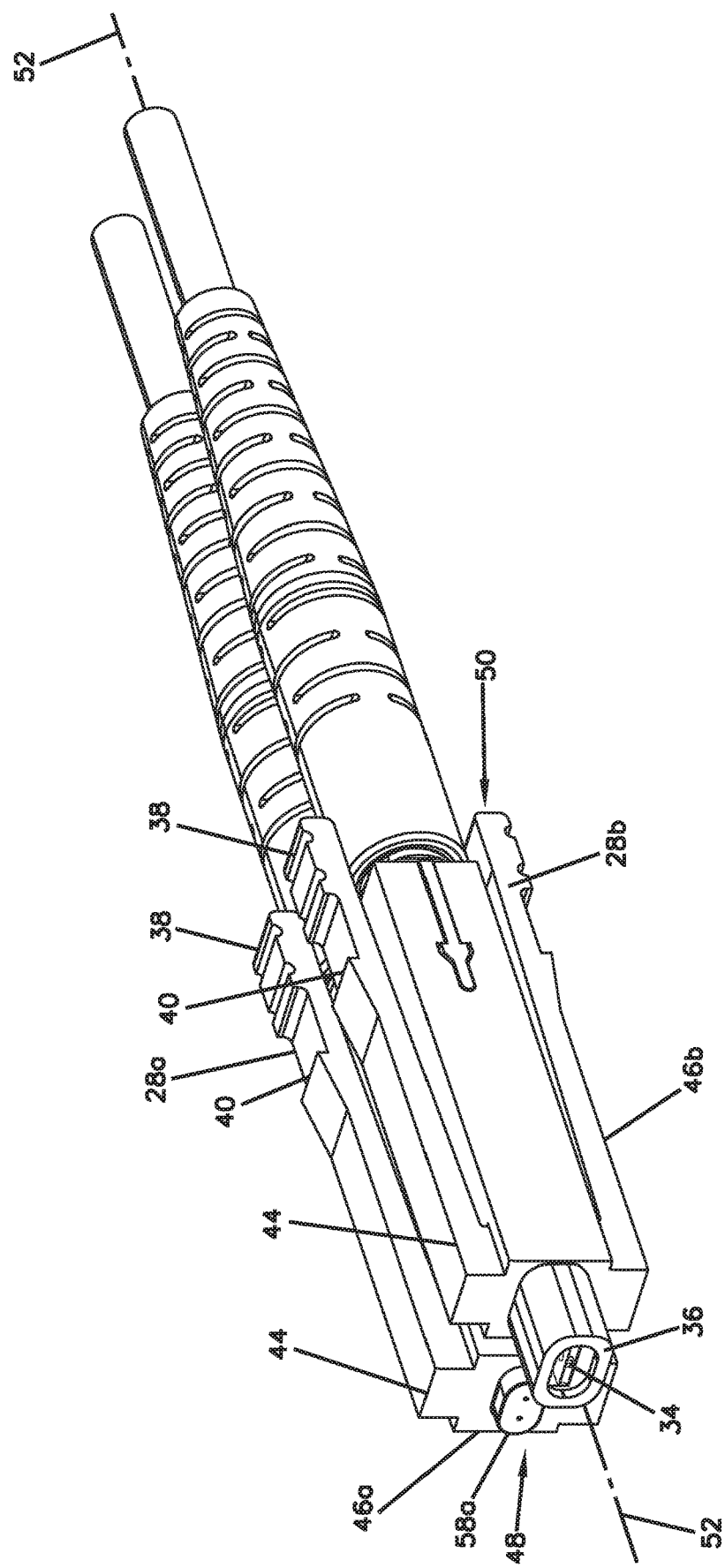
FIG. 4 illustrates the duplex fiber optic connector shown in FIG. 3 with the fiber optic adapter removed to show an alignment housing with a multi-fiber alignment device; in accordance with the principles of the present disclosure.
Figure 5:
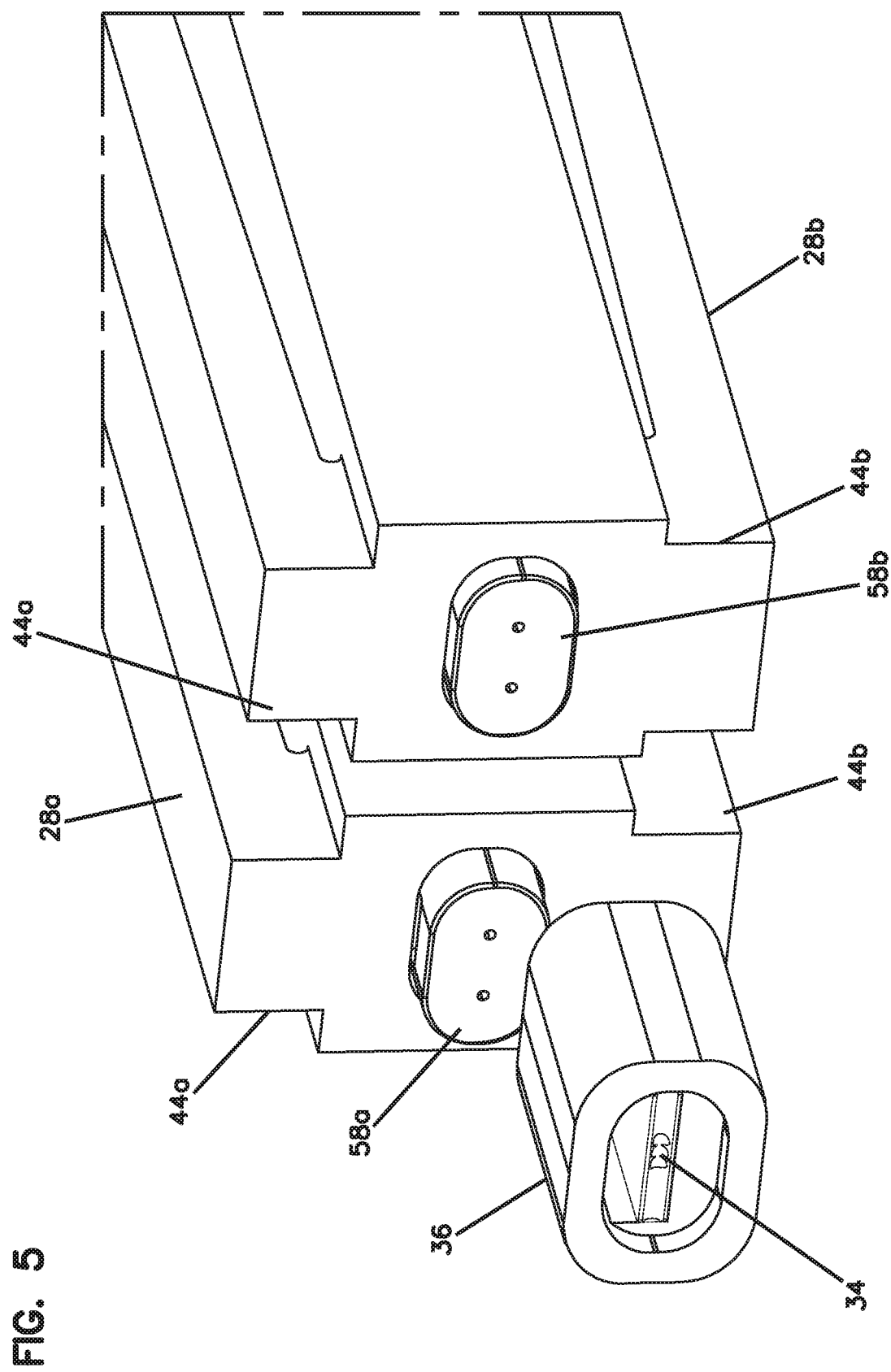
FIG. 5 is an enlarged view of a portion of the duplex fiber optic connector shown in FIG. 4.

FIGS. 4-5 are perspective views showing the duplex fiber optic connectors 28a and 28b removed from the fiber optic adapter 30. The fiber optic adapter 30 is arranged and configured to include a multi-fiber alignment device 34 (e.g., a multi-fiber alignment block, a multi-fiber alignment mechanism, etc.) that provides an alignment interface for respectively aligning optical fibers of the duplex fiber optic connectors 28a, 28b with optical fibers of another duplex fiber optic connector (not shown). Although a multi-fiber alignment device is shown, the features and advantages of the present disclosure may also relate to a single fiber alignment device. As shown, the multi-fiber alignment device 34 is housed within an alignment housing 36 that is arranged and configured to mount within the fiber optic adapter 30. Example multi-fiber alignment devices 34 are illustrated and described in detail with reference to FIGS.

10-19. It will be appreciated that such examples can also relate to single fiber alignment devices.

Optical fibers of the duplex fiber optic connectors 28a, 28b can be received within the multi-fiber alignment device 34 such that the fibers are co-axially aligned with optical fibers of another duplex fiber optic connector (not shown). The duplex fiber optic connectors 28a and 28b each include flexible latches 38 having retention catches 40 that mechanically retain the duplex fiber optic connectors 28a, 28b within their corresponding adapter ports 32 of the fiber optic adapter 30. It will be appreciated that the multi-fiber alignment device 34 is adapted to receive optical fibers that are not supported by or secured within corresponding ferrules. It will also be appreciated that each of the duplex fiber optic connectors 28a, 28b and fiber optic adapter 30 are comprised entirely of non-metallic materials, e.g. plastics, polymers, etc. The absence of any metal within the duplex fiber optic connectors 28a, 28b and fiber optic adapter 30 creates an interference-free signal environment.

In certain examples, the multi-fiber alignment devices 34 can be mounted generally at a mid-plane of the fiber optic adapter 30. The adapter ports 32 can include keyways 42 (see FIG. 7) that receive corresponding keys 44 of the duplex fiber optic connectors 28. The keys 44 and keyways 42 can be configured to interface such that the duplex fiber optic connectors 28 can only be inserted into the adapter ports 32 in one orientation. As depicted, each of the duplex fiber optic connectors 28 includes two keys 44a, 44b (see FIG. 5) respectively positioned on both sides of the duplex fiber optic connectors 28a, 28b. The keys 44a, 44b can each have a width that extends substantially across an entire width of the duplex fiber optic connectors 28a, 28b. In certain examples, keys 44a, 44b have widths that extend across at least a majority of the width of the duplex fiber optic connector 28. In certain examples, the keys 44 can be provided on only one side of the duplex fiber optic connectors 28a, 28b so as to provide a readily apparent visual and physical cue to an installer regarding the proper orientation of the duplex fiber optic connectors 28a, 28b during insertion into the fiber optic adapter 30.

Still referring to FIG. 4, the duplex fiber optic connectors 28a, 28b each include a connector body 46a, 46b having a front end 48 and an opposite rear end 50. The connector body 46a, 46b defines a longitudinal axis 52 that extends through the connector body 46 in an orientation that extends from the front end 48 to the rear end 50 of the connector body 46.

Figure 6:
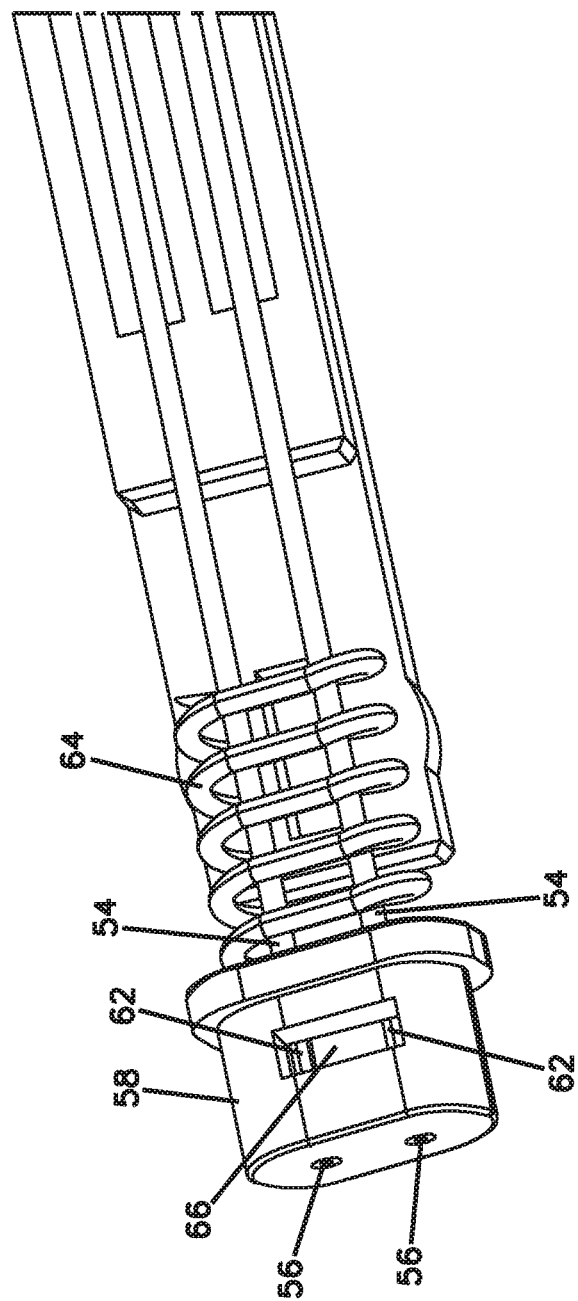
FIG. 6 illustrates a schematic view of portions of a ferrule-less fiber optic connector in accordance with the principles of the present disclosure, the fiber optic connector is shown with a retractable nose piece.

Turning to FIG. 6, optical fibers 54 extend through the connector body 46 from the rear end 50 to the front end 48. The optical fibers 54 have fiber ends 56 accessible at the front end 24 of the connector body 46. The duplex fiber optic connectors 28a, 28b each include a retractable nose piece 58a, 58b (see FIG. 5) respectively mounted at the front end 48 of the connector body 46a, 46b. It will be appreciated that the nose pieces 58a, 58b of the duplex fiber optic connectors 28a and 28b can have identical configurations and therefore the general reference number 58 is applicable to each of the nose pieces 58a, 58b of the duplex fiber optic connectors 28a and 28b.

As shown in FIGS. 7-9 with reference to the optical connector 10 and the duplex fiber optic connector 28, the nose piece 58 defines fiber passages 60 through which the optical fibers 54 extend. The nose piece 58 is movable along the longitudinal axis 52 between an extended position (see FIG. 8) where a front end portion 62 of the optical fibers 54 is protected within the fiber passages 60 and a retracted position (see FIG. 9) where the front end portion 62 of the optical fibers 54 project forwardly beyond the nose piece 58. In certain examples, the optical connector 10 and duplex fiber optic connectors 28a and 28b can each include a spring 64 for biasing the nose piece 58 toward the extended position. In certain examples, the nose piece 58 retracts back into the respective connector body 12, 46 as the nose piece 58 moves from the extended position toward the retracted position. In certain examples, relative movement is permitted between the nose piece 58 and the optical fibers 54 so that the nose piece 58 can slide relative to the optical fibers 54. As shown in FIG. 5, the nose piece 58 can be arranged and configured to coarsely align with the alignment housing 36 upon insertion of the duplex fiber optic connector 28 into the fiber optic adapter 30. In certain examples, a tip of the nose piece 58 abuts against the multi-fiber alignment device 34.

The nose piece 58 can define a cavity 66 (see FIG. 6) that receives fiber tips of the optical fibers 54 when the nose piece 58 is not in the retracted position. The cavity 66 can be at least partially filled with a non-gaseous fluid (e.g., a refractive index matching gel) for encapsulating the fiber tips 56. In certain examples, the non-gaseous fluid can be filled in the cavity 66 in a volume slightly less than a volume of the cavity. The cavity 66 can be in fluid communication with the fiber passage 60 such that the fiber tips 56 of the optical fibers 54 pass therethrough to be cleaned prior to coupling (e.g., mating). The refractive index gel can have a refractive index between 1.45 and 1.60, although alternatives are possible.

In certain examples, the non-gaseous fluid functions to clean the end faces of the optical fibers 54 when the end faces are inserted therein. In certain examples, the non-gaseous fluid generally maintains its shape but has a viscosity that allows the non-gaseous fluid to flow or otherwise move so as to receive the fiber tips of the optical fibers 54. The optical fibers 54 remain immersed in the non-gaseous fluid while the connector is in an unmated state.

In certain examples, a fiber anchoring region can be positioned near the rear end of the connector body where the optical fiber is fixed in position relative to the connector body thereby preventing relative axial movement between the fiber and the connector body at the anchoring location. In certain examples, a fiber buckling region is provided in the connector body between the anchoring region and the end portion of the optical fiber. The buckling region allows the fiber to buckle (i.e., bend, flex) within the connector body when an optical connection is being made.

Figure 10:
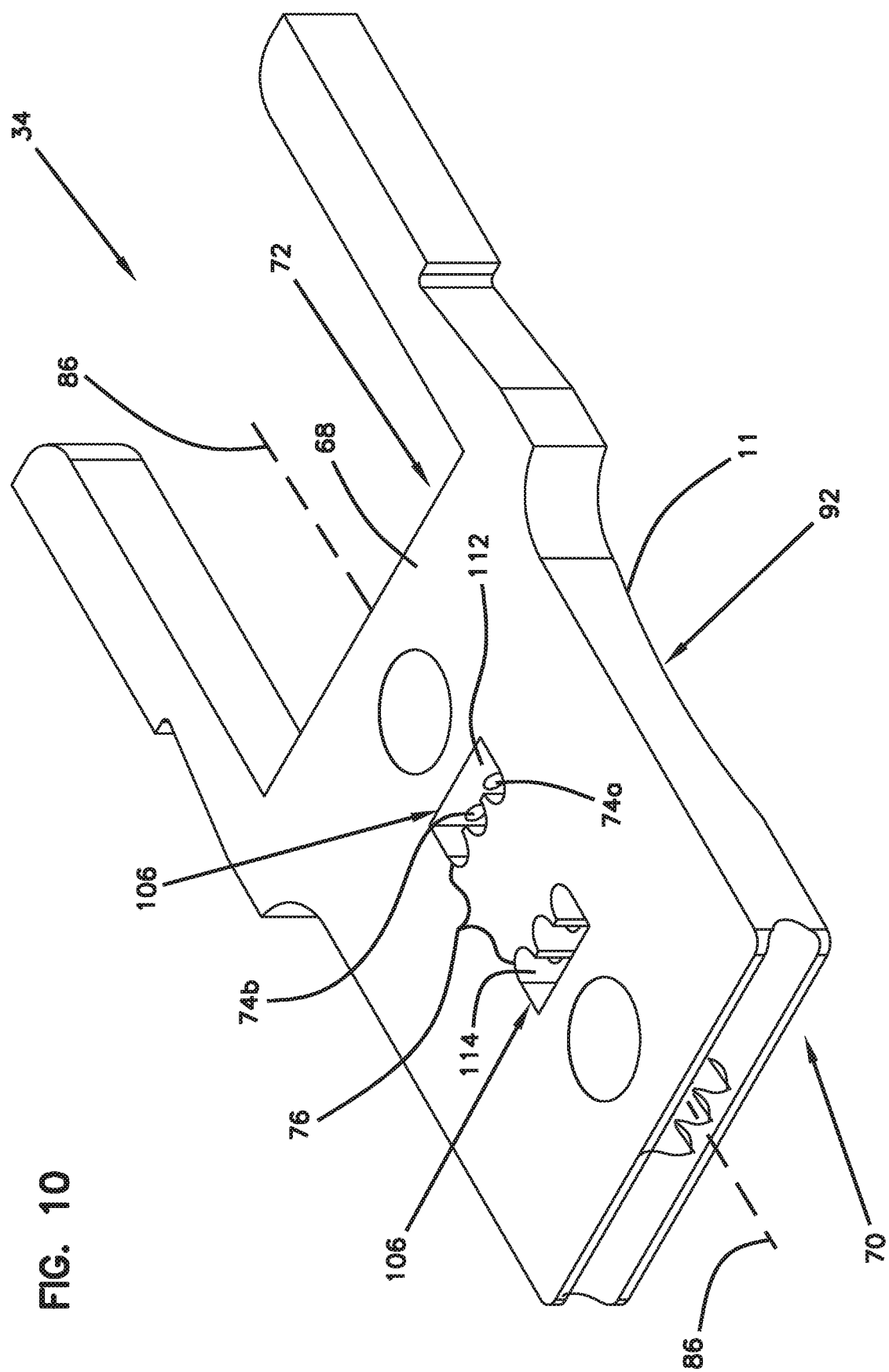
FIGS. 10-13 illustrate an example multi-fiber alignment device in accordance with the principles of the present disclosure.

Referring to FIG. 10, the example multi-fiber alignment device 34 is depicted. It will be appreciated that a variety of different types of multi-fiber alignment devices can be used to provide coaxial alignment of the optical fibers of the duplex fiber optic connectors 28 desired to be optically coupled. Although the design and advantageous features are described herein with reference to the example multi-fiber alignment device 34, they can also relate to a single fiber alignment device.

The multi-fiber alignment device 34 can be molded out of ceramic, or like material, although alternatives are possible. For example, it would also be possible to make the multi-fiber alignment device 34 out of plastic, glass, metal, or any other known material. By using a moldable material, the multi-fiber alignment device 34 may be quickly and easily manufactured.

The multi-fiber alignment device 34 is provided to precisely align individual fibers of optical connectors secured within ports of an adapter for alignment with fibers in another like connector. The multi-fiber alignment device 34 can be referred to as ferrule-less multi-fiber alignment device since it provides optical fiber alignment without using or receiving ferrules (e.g., SC ferrules, LC ferrules, etc.).

The multi-fiber alignment device 34 can include an alignment body 68 that has a first end 70 and an opposite second end 72. The alignment body 68 can be a one piece molded part having a unitary, seamless construction (e.g., a monolithic construction). The multi-fiber alignment device can include a plurality of alignment bores 74 that extend between the first and second ends 70, 72 of the alignment body 68. The alignment body 68 is arranged and configured to define and fully encircle each one of the alignment bores 74. That is, each one of the plurality of alignment bores 74 are fully enclosed.

In certain examples, the plurality of alignment bores 74 can be fixed sized bores (e.g., rigid bores). The fixed sized bores can each have a fixed effective diameter. Herein by the term, "fixed" and variants thereof, in this context, it is meant that the diameter of the fixed sized bores does not change when an optical fiber is inserted therein.

As depicted in FIG. 10, the plurality of alignment bores 74 are generally round holes. The multi-fiber alignment device 34 includes alignment bores 74 defined at first and second ends 70, 72 for mating duplex fiber optic connectors 28. The plurality of alignment bores 74 of the multi-fiber alignment device 34 can have a rigid construction that allows the plurality of alignment bores 74 of the multi-fiber alignment device 34 to be manufactured to very tight tolerances. The plurality of alignment bores 74 are arranged and configured to remain the same size and not change over time. The plurality of alignment bores 74 can allow for a tight tolerance with the optical fiber 54 which helps to provide low insertion loss.

The fixed effective diameter of the plurality of alignment bores 74 may be larger than a nominal diameter of the optical fiber 54 that is intended to be inserted therethrough. In one example, a fixed effective diameter of the plurality of alignment bores 74 is no more than 1.5 microns larger than a maximum outer diameter of the optical fiber 54 to be inserted therein. In one example, a fixed effective diameter of the plurality of alignment bores 74 is no more than 1.0 microns larger than a maximum outer diameter of the optical fiber 54 to be inserted therein. In other examples, a fixed effective diameter of the plurality of alignment bores 74 is no more than 0.5 microns larger than a maximum outer diameter of the optical fiber 54 to be inserted therein. In certain examples, a fixed effective diameter of the plurality of alignment bores 74 is no more than 2 microns larger than a maximum outer diameter of the optical fiber 54 to be inserted therein. In one example, a fixed effective diameter of the alignment bores 74 can be in the range of about 125.5 microns to about 126.5 microns.

The plurality of alignment bores 74 can have tolerances in the range of ±0.3 microns. In certain examples, the optical fiber 54 has a diameter of between about 124 microns to about 125 microns, although alternatives are possible. The optical fiber 54 can have tolerances in the range of ±0.5 microns. It is important to note that tolerances will vary depending upon the material used for the multi-fiber alignment device 34. While the tolerance ranges are important to the proper operation of the present invention, it will be recognized that greater or lesser diameters may be used, without departing from the spirit or scope of the present disclosure.

Figure 11:
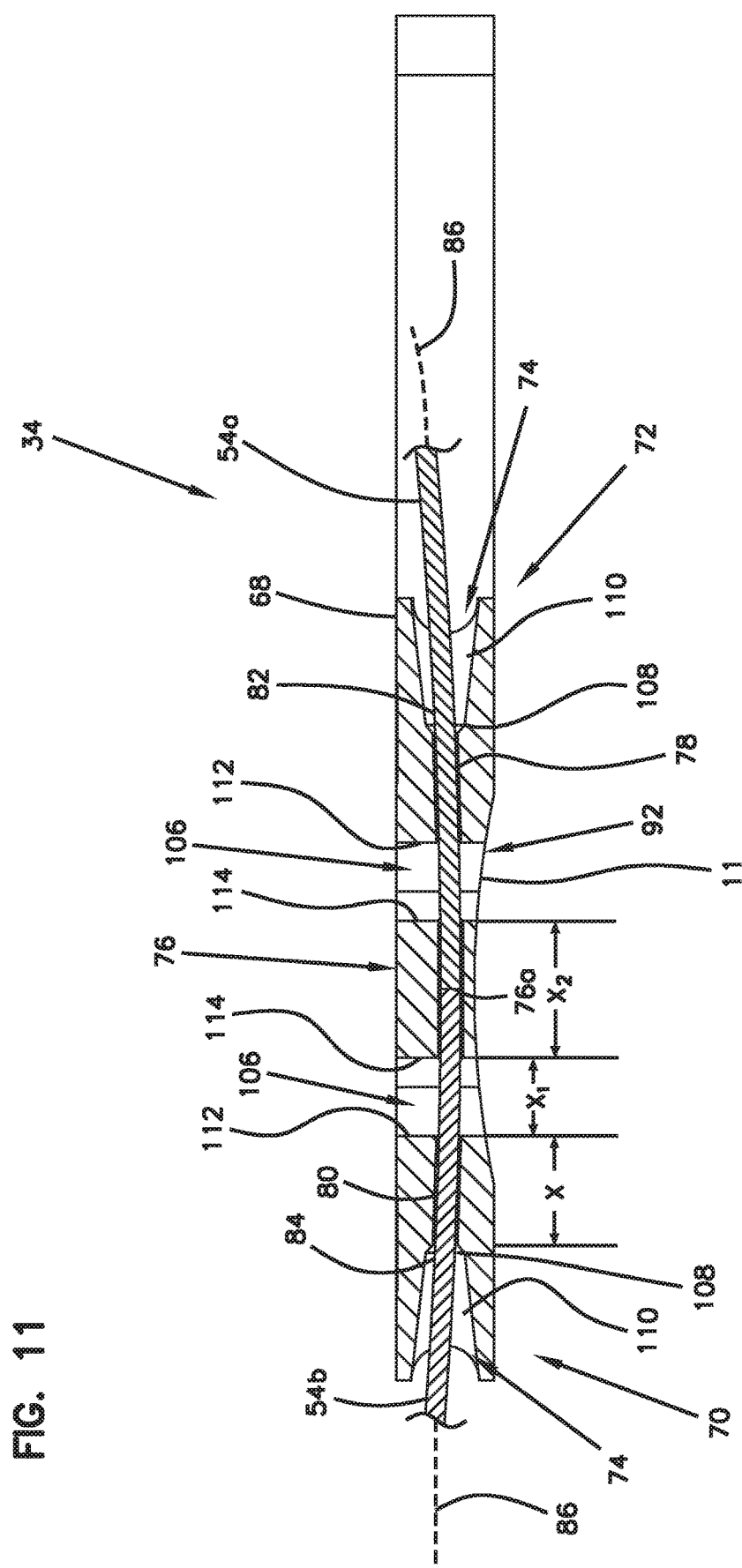
Figure 12:
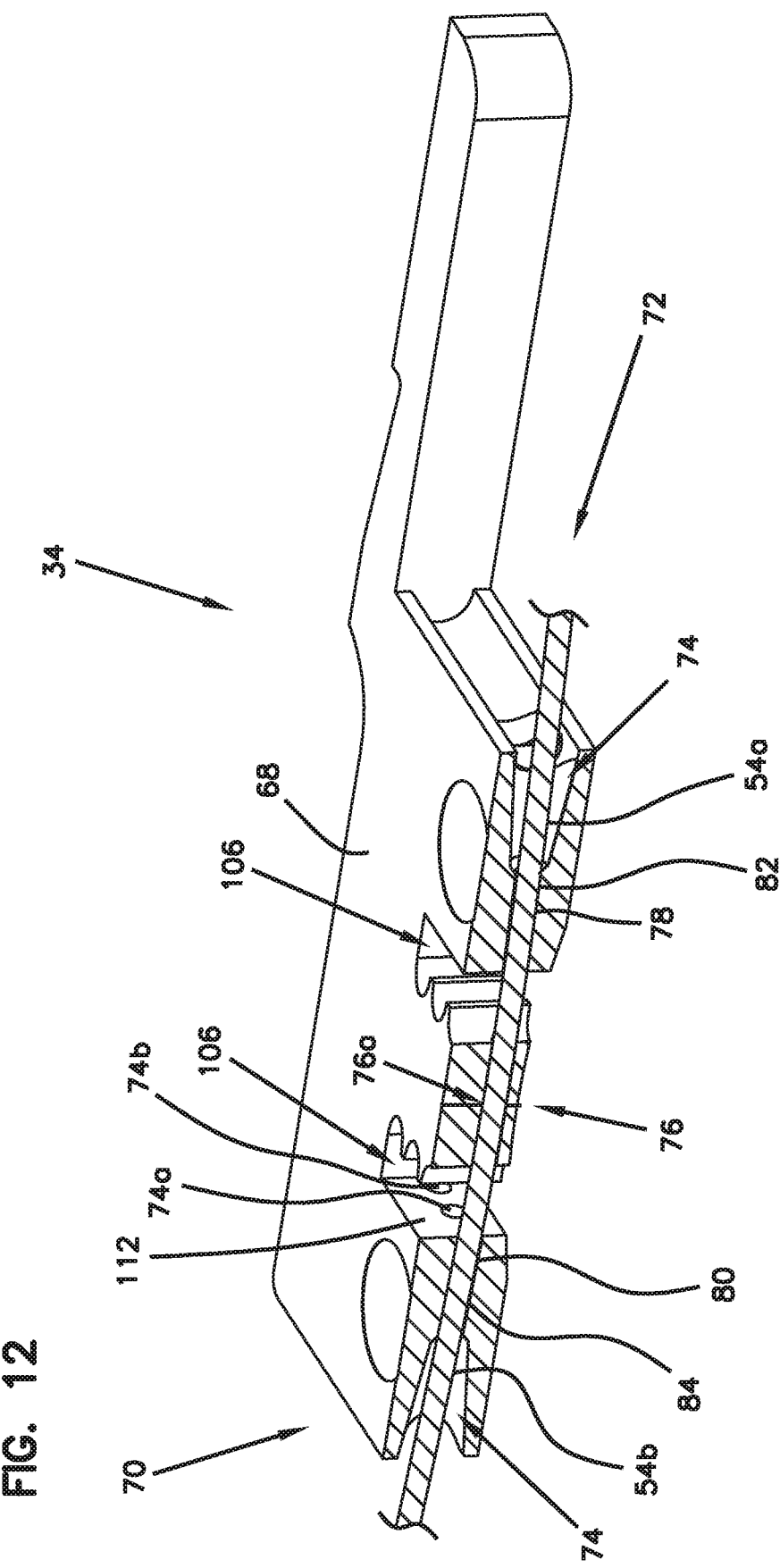
Figure 13:
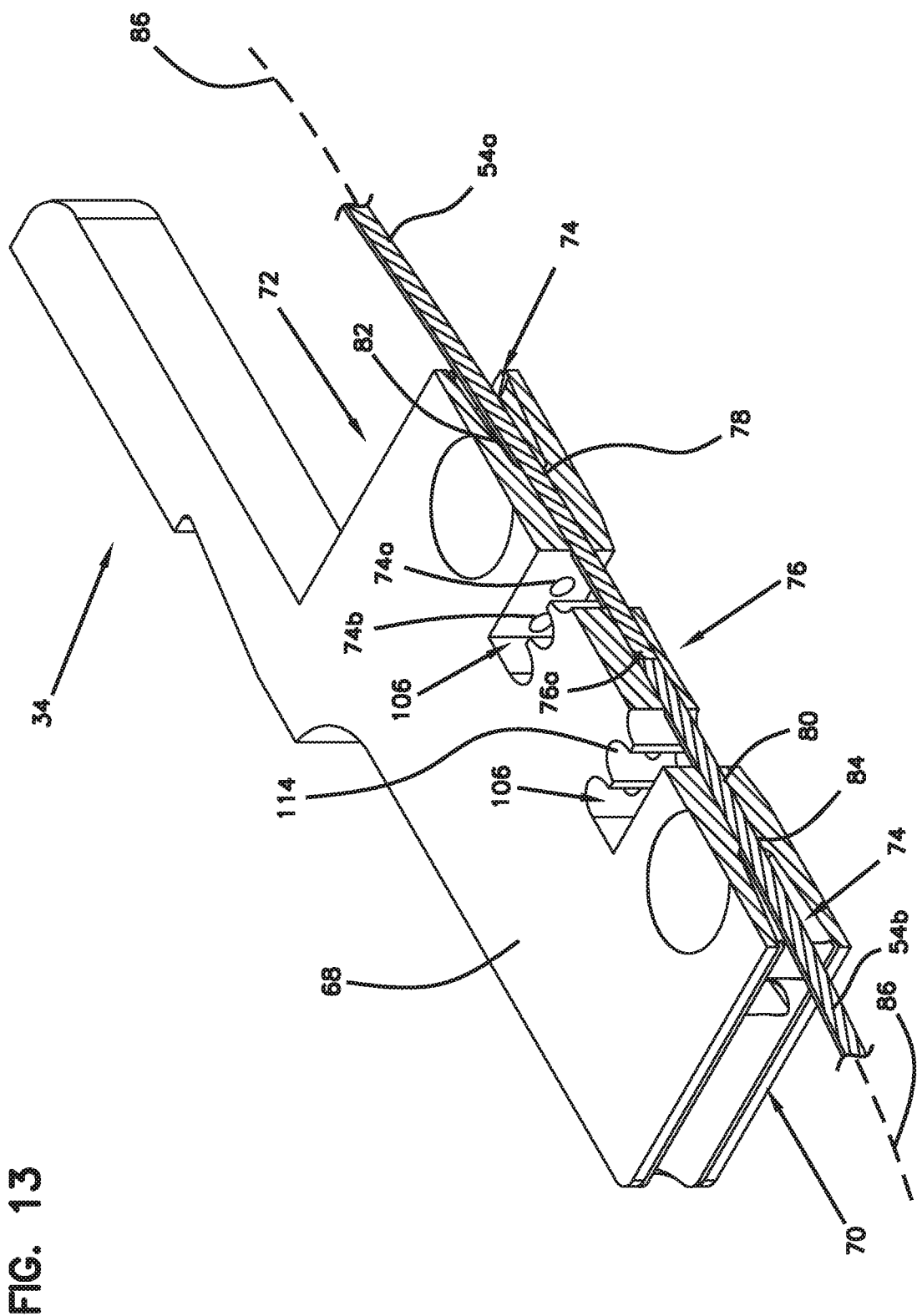

Referring to FIGS. 11-13, the multi-fiber alignment device 34 can include an intermediate region 76 positioned between the first and second ends 70, 72 of the one piece alignment device 34. Thus, the alignment bores 74 also pass through the intermediate region 76 between the first and second ends 70, 72. In certain examples, the intermediate region 76 can be a mid-region of the multi-fiber alignment device 34, although alternatives are possible. In certain examples, the intermediate region 76 includes a fiber contact location 76a (i.e., a fiber abutment location) where two optical fibers meet.

The plurality of alignment bores 74 can each include first and second curved portions 78, 80 that are located on opposite sides of the intermediate region 76. The first and second curved portions 78, 80 are symmetrical. Each one of the first and second curved portions 78, 80 of the plurality of alignment bores 74 define first and second curved passages 82, 84. In certain examples, the first and second curved passages 82, 84 can extend along a fiber insertion curved axis 86 between the first and second ends 70, 72 of the alignment body 68 to receive first and second optical fibers 54a, 54b, respectively.

One aspect of the present disclosure is to achieve a curved alignment bore by having a cutout feature 92 defined in a bottom surface 11 of the alignment body 68, although alternatives are possible. The cutout feature 92 provides the alignment bores 74 with a varying wall thickness that ultimately provides for differential cooling during processing. Details of such method is described below with reference to FIGS. 14 and 15.

In certain examples, the first and second curved passages 82, 84 of the alignment bores 74 can have different transverse cross-sectional shapes such as octagonal shapes, circular shapes, triangular shapes, square shapes, or other shapes.

Upon insertion of the first and second optical fibers 54a, 54b into the first and second curved portions 78, 80, the first and second curved portions 78, 80 can cause tips of the first and second optical fibers 54a, 54b to be biased toward one side of the alignment bore 74. That is, curves formed in the first and second curved portions 78, 80 can enable the first and second curved portions 78, 80 to correspondingly bend the inserted first and second optical fibers 54a, 54b. Thus, when the first and second optical fibers 54a, 54b are inserted in the alignment bore 74 defined by the alignment body 68, the first and second optical fibers 54a, 54b are urged into the intermediate region 76 and the tips of the first and second optical fibers 54a, 54b are biased to one side of the alignment bore 74.

In certain examples, the alignment bores 74 may include a chamfered surface to guide the optical fibers 54 therein. The tips of the first and second optical fibers 54a, 54b can meet at the fiber contact location 76a.

It will be appreciated that the first and second curved portions 78, 80 are shown exaggerated for demonstration purposes. In certain examples, the first and second curved portions 78, 80 result in just a few microns. In certain examples, the first and second curved portions 78, 80 can result in an offset that ranges from about 2 microns to 5 microns from a nominal centerline axis 118 of the alignment bore 74, although alternatives are possible.

Another aspect of the present disclosure relates to methods of forming a multi-fiber alignment device with curved bores.

Figure 14:
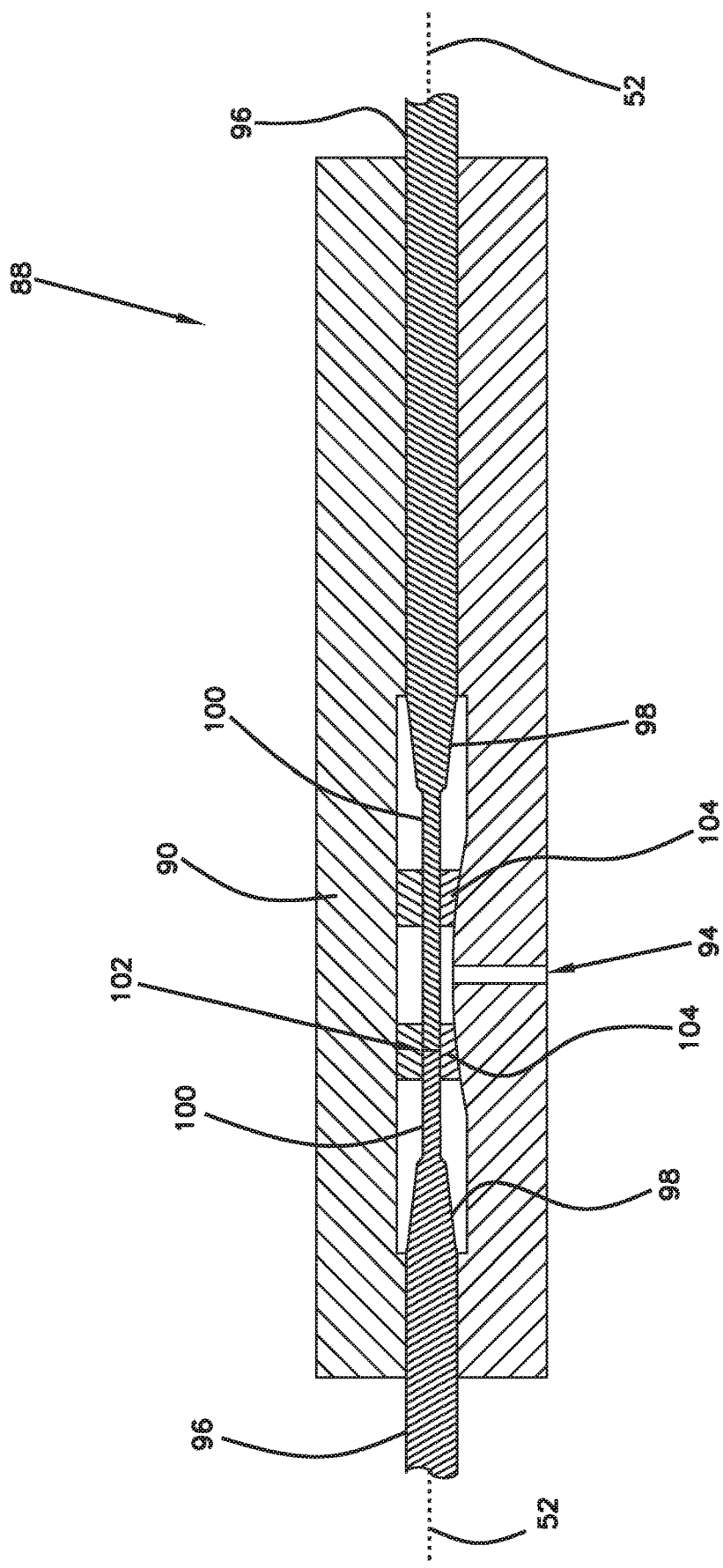
FIGS. 14-15 illustrate an example molding tool for making the multi-fiber alignment device of FIG. 10.
Figure 15:
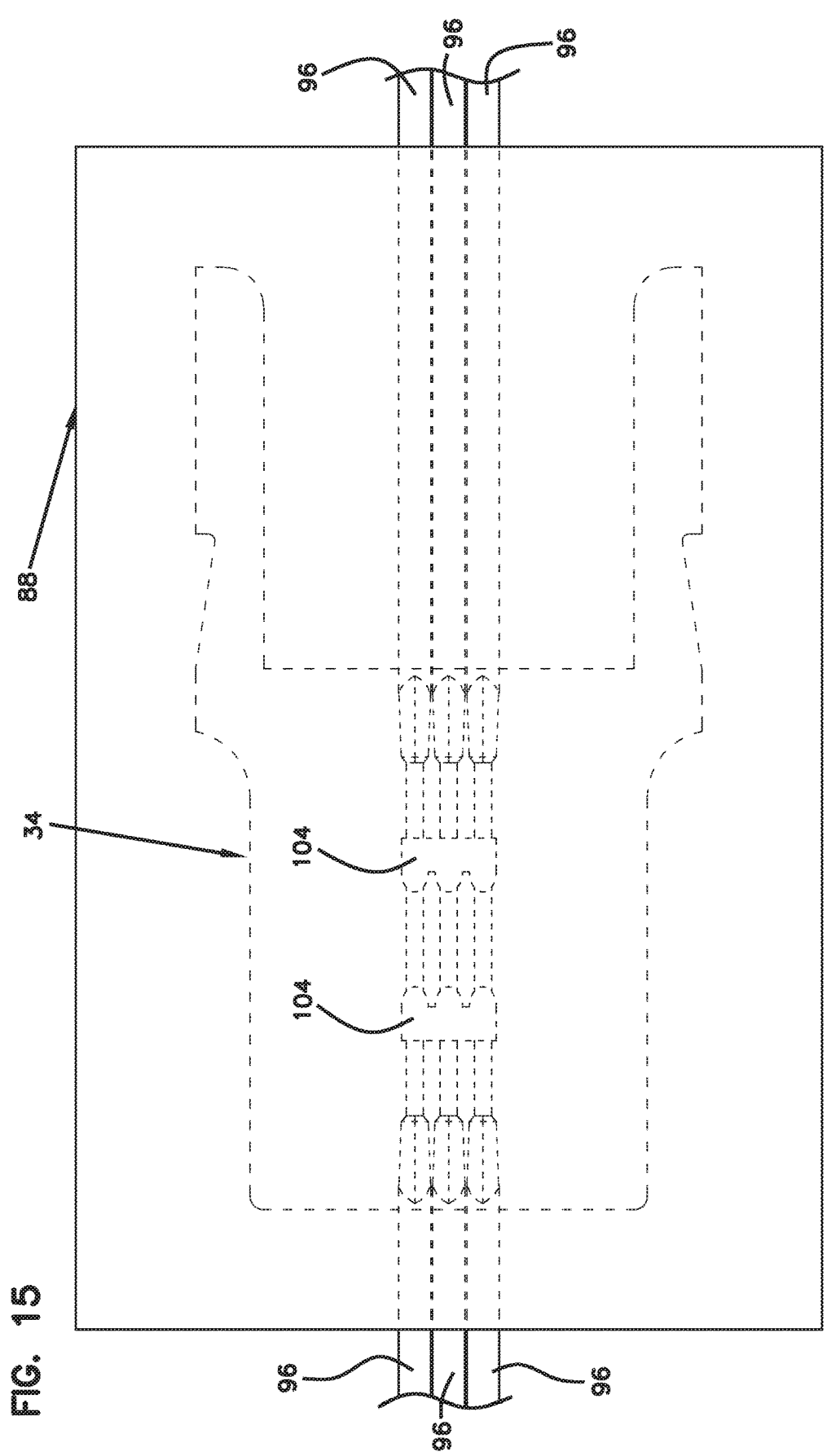

Referring to FIGS. 14 and 15, an example molding tool 88 including a cavity 90 is depicted. The cavity 90 can be configured to have an inverse shape to form a cutout 92 in the bottom of the multi-fiber alignment device 34 as shown in FIG. 11. The cavity 90 of the molding tool 88 can form a varying wall thickness along the alignment bores 74 formed in the molding tool 88. As such, the wall thickness is designed to be slightly thinner at the cutout 92.

The molding tool 88 includes a port 94 for injecting a resin or polymeric material that can be used to form a mold. The method can include a step of placing first and second insert pins 96 into the molding tool 88 at opposite sides thereof. The first and second insert pins 96 being inserted into the molding tool 88 along the longitudinal axis 52 such that the first and second insert pins 96 can meet at a meeting location 102 in the molded article, i.e., alignment body 68. It will be appreciated that the meeting location 102 may not be the mid-region of the molded article, although alternatives are possible.

In certain examples, the first and second insert pins 96 can be shaped generally straight. In certain examples, the first and second insert pins 96 can each include a tapered portion 98 and a straight portion 100, although alternatives are possible. In certain examples, the first and second insert pins 96 may include rounded or conical shaped tips. The shaped tips can allow the first and second insert pins 96 to enter the mold even if slightly offset. In certain examples, only one insert pin 96 may be used.

In certain examples, additional insert pieces 104 can be inserted into the molding tool 88 to form openings 106 defined in the alignment body 68 of the multi-fiber alignment device 34. In certain examples, the openings 106 can be formed on opposite sides of the intermediate region 76. Once the insert pins 96 and other insert pieces 104 have been placed in the molding tool 88, the molding tool 88 is closed and a polymer resin is injected through the port 94 into the molding tool 88 until the cavity 90 is filled. The polymer resin flows around the insert pins 96 and insert pieces 104 and fills in void areas in the molding tool 88 to form a molded article, i.e., the alignment body 68.

When the molded article, i.e., the alignment body 68 is rigid enough (e.g., before fully cured or cooled), the molding tool 88 can be opened and the molded article removed. In certain examples, the molded article can be allowed to cool while positioned inside of the molding tool 88. Once the molded article starts to cool, the first and second insert pins 96 and the insert pieces 104 can be removed therefrom. Thus, the alignment bore 74 is formed as a result of molding around the first and second insert pins 96 positioned in the molding tool 88.

It will be appreciated that the molding tool 88 can be arranged and configured to mold a plurality of insert pins 96 to form a plurality of alignment bores 74 within the alignment body 68.

The method can also include a step of unevenly cooling the molded article, i.e., the alignment body 68 due to the varying wall thickness along the plurality of alignment bores 74. Because the wall thickness varies along the alignment bores 74, different thermal stresses can be applied to the molded article when it begins to cool. Thin and thick wall locations of the molded article can be cooled at different rates. That is, the slightly thinner wall thickness at the cutout 92 will cool faster, which can cause the molded article, i.e., the alignment body 68 to warp, bow, or bend. It will be appreciated that the amount of warp, bow, or bend may not be visible to the naked eye. The warp, bow, or bend in the alignment body 68 causes the alignment bores 74 to be curved. The multi-fiber alignment device 34 of the present disclosure optimally improves or reduces the connection loss of a fiber optic connector. The process used to make the multi-fiber alignment device 34 can be cost effective, robust and repeatable.

Turning again to FIG. 11, the alignment bore 74 is depicted as having a length X that can extend from a chamfered surface 108 of a "funnel" shaped lead-in passage shown generally at 110 to the opening 106. The length X of the alignment bore 74 can be the same at both the first and second ends 70, 72, although alternatives are possible. The length X of the alignment bores 74 can extend from the lead-in passage 110 at respective first and second ends 70, 72 toward a respective opening 106 adjacent the intermediate region 76. The lead-in passage 110 can help to facilitate guiding of the optical fiber into the alignment bore 74. In certain examples, the length X of the alignment bore 74 from the lead-in passage 110 to the opening 106 is about 0.6 mm, although alternatives are possible.

In certain examples, the openings 106 can have a length $X_1$ measured from a respective endface 112 of the alignment bore 74 to a respective endface 114 of the intermediate region 76. In certain examples, the length $X_1$ of the openings 106 is about 0.4 mm, although alternatives are possible. In certain examples, the respective endfaces 114 of the intermediate region 76 may include chamfer surfaces at the alignment bores 74 to help guide optical fibers therein.

In certain examples, the intermediate region 76 can have a length $X_2$ that is measured between the openings 106. In certain examples, the length $X_2$ of the intermediate region 76 is about 0.7 mm, although alternatives are possible.

In certain examples, the method of forming a fiber alignment device can include a step of molding an alignment bore that extends between first and second ends of a one piece alignment body. The one piece alignment body fully encircling the alignment bore. The method can also include a step of unevenly cooling the one piece alignment body causing the alignment bore to bend. The step of unevenly cooling can be achieved by having varying wall thicknesses along the alignment bore.

In certain examples, the multi-fiber alignment device 34 may not include any structure associated with the plurality of alignment bores 74 that deflects upon insertion of the optical fibers. For example, the multi-fiber alignment device 34 can be free of depressing members (e.g., springs, flexible cantilevers, etc.) that can deflect (e.g., flex, move) upon insertion of optical fibers in the plurality of alignment bores 74.

Figure 16:
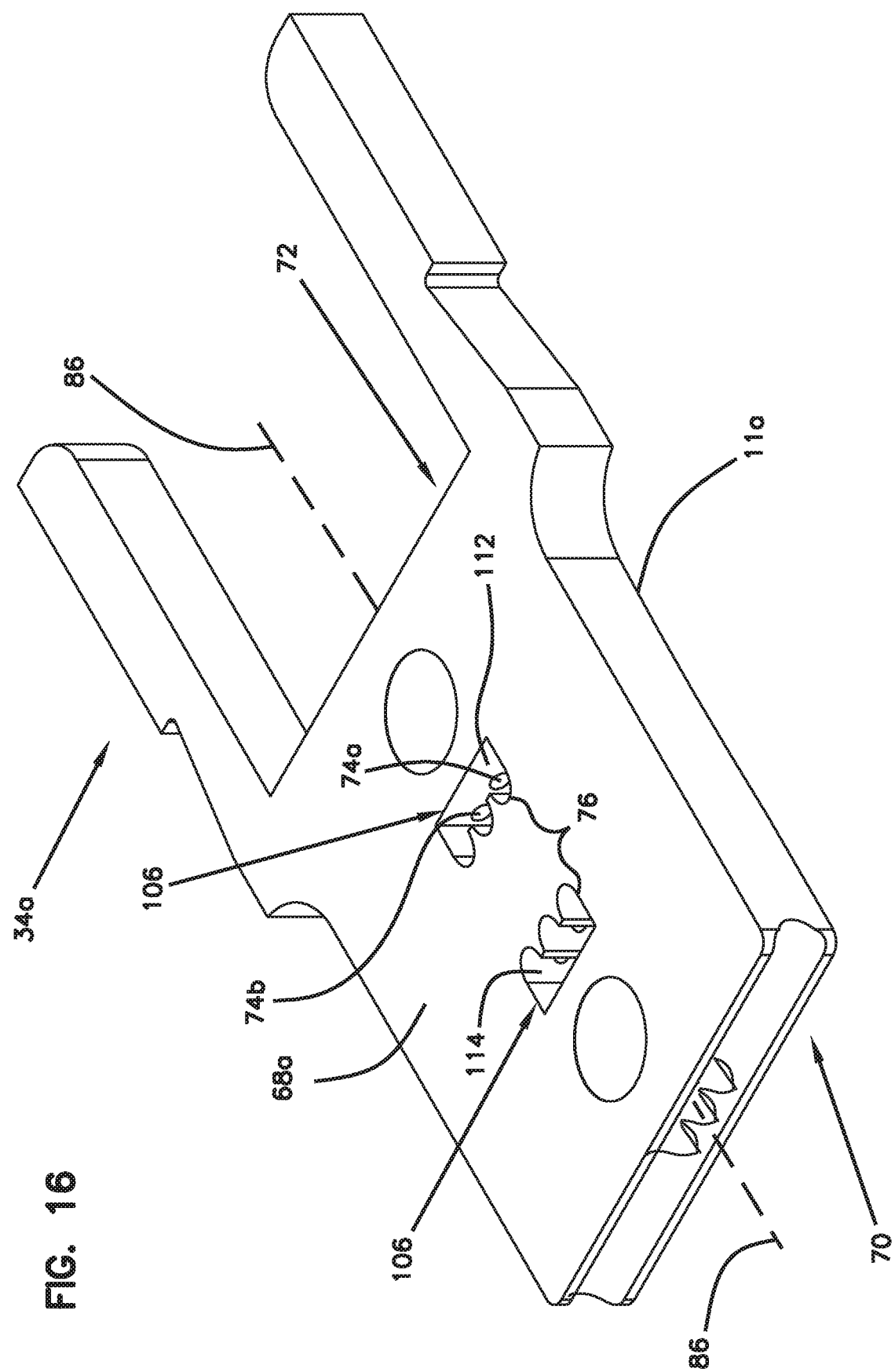
FIGS. 16-19 illustrate another example multi-fiber alignment device in accordance with the principles of the present disclosure.
Figure 17:
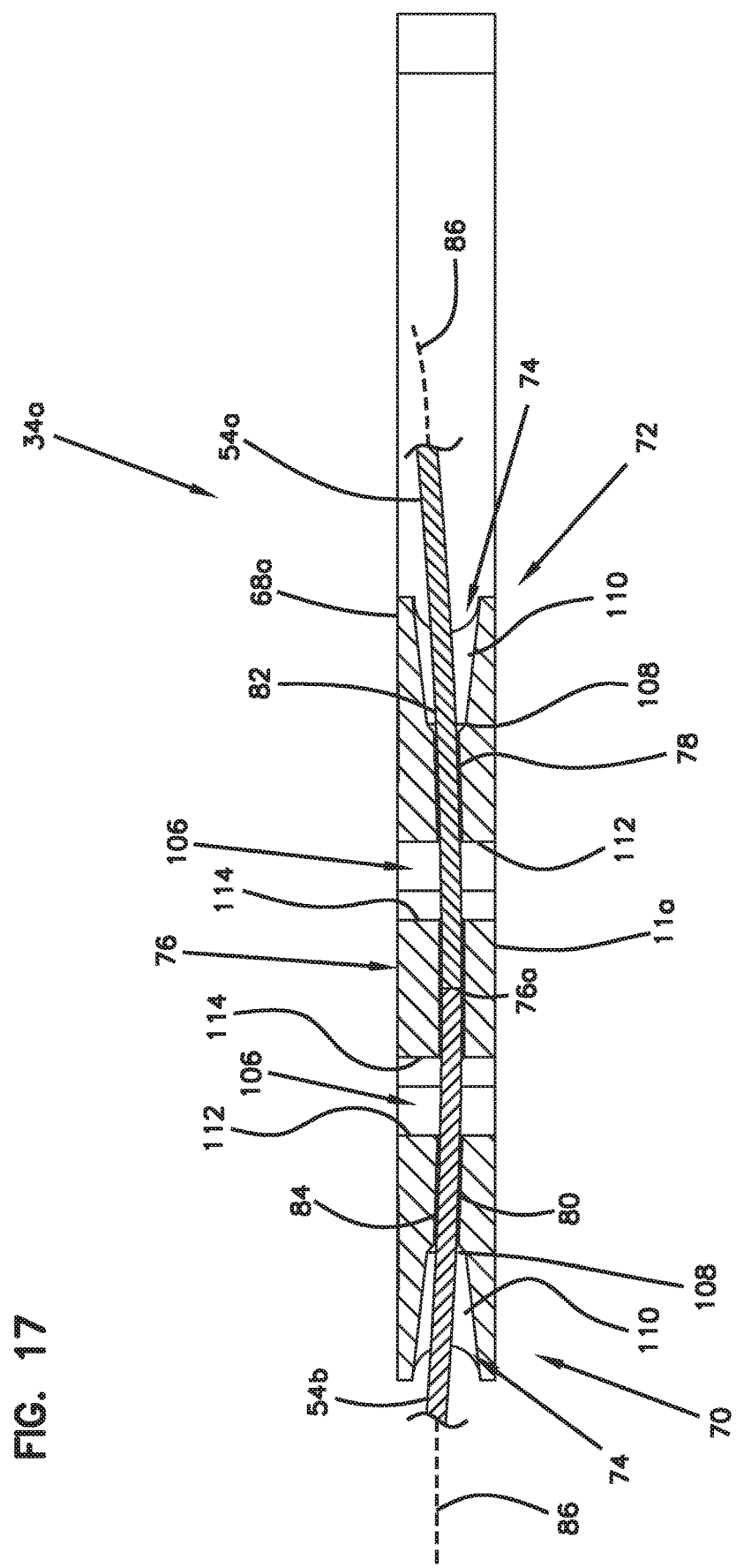
Figure 18:
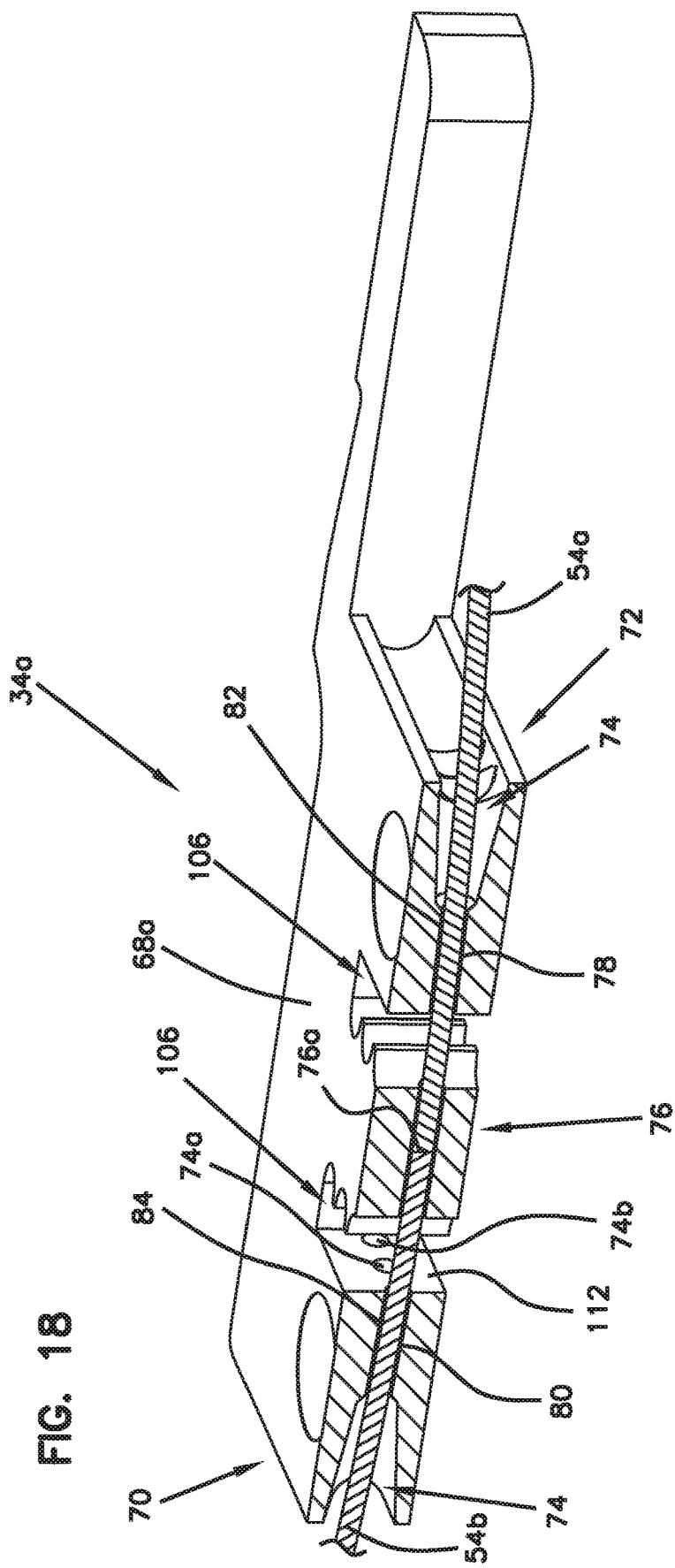
Figure 19:
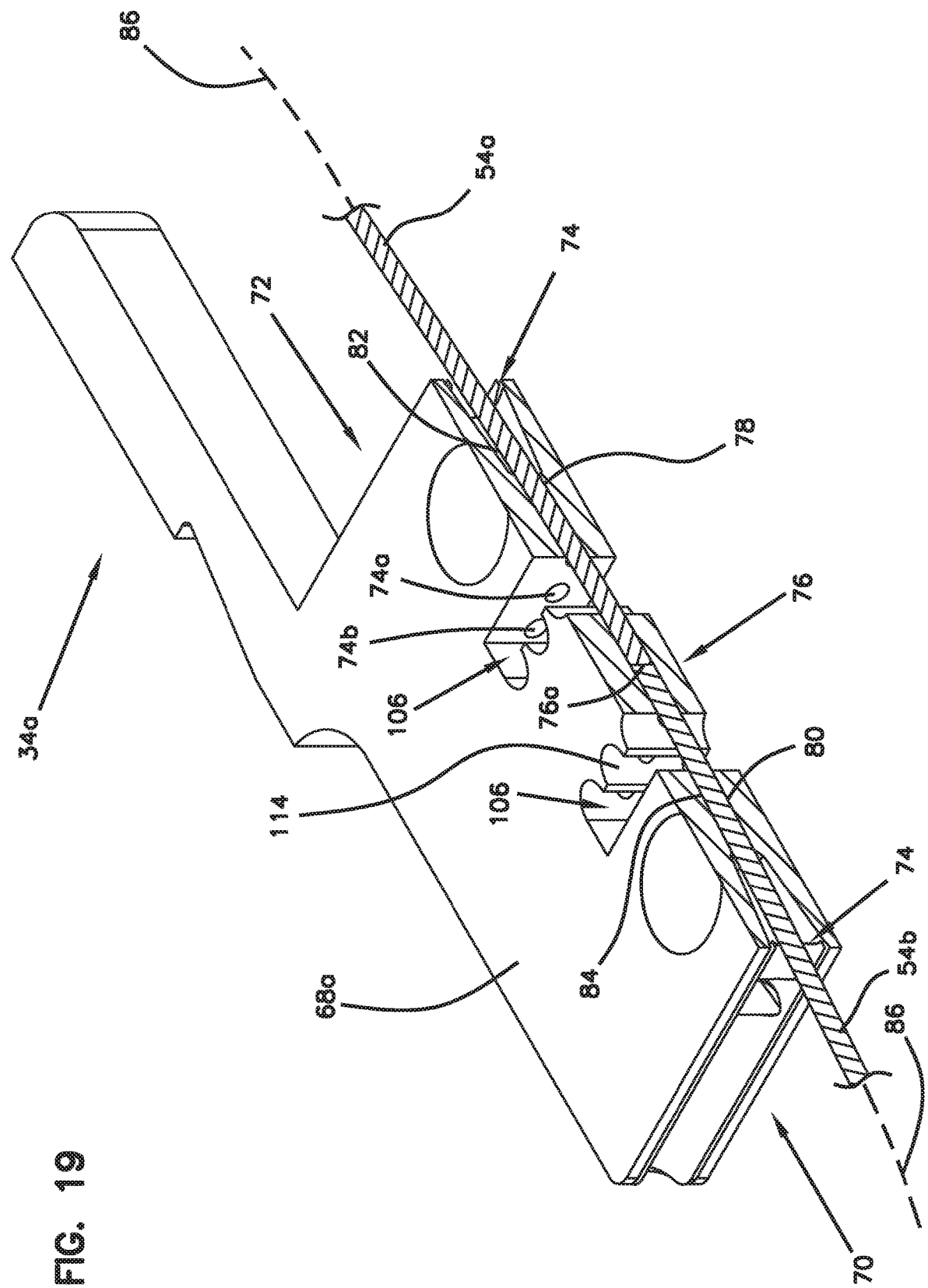

Turning to FIG. 16, another example multi-fiber alignment device 34a is depicted. The multi-fiber alignment device 34a can be embodied with some of the same features and advantages as the multi-fiber alignment device 34 described above. For the sake of brevity, only those portions that differ from the multi-fiber alignment device 34 illustrated in FIGS. 10-13 discussed above will be described in detail.

Similar to the multi-fiber alignment device 34 described above, the multi-fiber alignment device 34a can include an alignment body 68a that has a first end 70 and an opposite second end 72. The alignment body 68a can be a one piece molded part having a unitary, seamless construction (e.g., a monolithic construction). The multi-fiber alignment device can include a plurality of alignment bores 74 that extend between the first and second ends 70, 72 of the alignment body 68a. The alignment body 68a is arranged and configured to define and fully encircle each one of the alignment bores 74. That is, each one of the plurality of alignment bores 74 are fully enclosed. The plurality of alignment bores 74 can each include first and second curved portions 78a, 80a that are located on opposite sides of an intermediate region 76a. The first and second curved portions 78a, 80a are symmetrical.

Unlike the multi-fiber alignment device 34 illustrated in FIGS. 10-13, the curved alignment bores 74 of the multi-fiber alignment device 34a are not achieved by differential cooling. Rather, the curved alignment bores 74 are achieved by utilizing curved insert pins 116 during the molding process which is described below.

Turning to FIGS. 16-19, the multi-fiber alignment device 34a does not have a cutout feature in a bottom surface 11a of the alignment body 68a. Rather, the bottom surface 11a provides the alignment bores 74 with an even wall thickness.

Another aspect of the present disclosure relates to another method of forming a fiber alignment device with curved bores.

Figure 20:
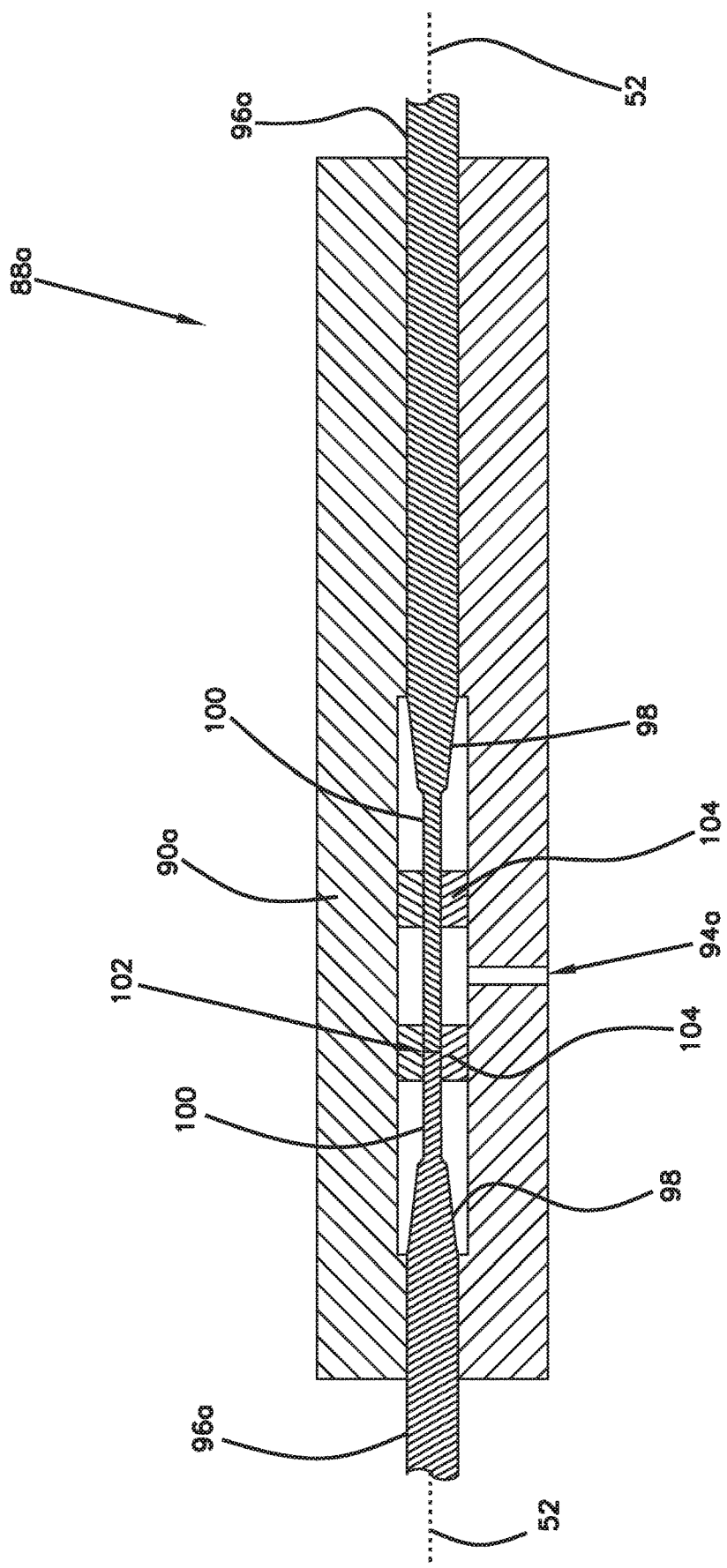
FIG. 20 illustrates another example molding tool for making the multi-fiber alignment device of FIG. 16.

Referring to FIG. 20, another example molding tool 88a including a cavity 90a that does not have an inverse shape is depicted. The molding tool 88a includes a port 94a for injecting a resin or polymeric material that can be used to form a mold. In order to achieve the curved alignment bores 74, flexible insert pins 96a can be inserted into the molding tool 88a for injection molding. In certain examples, at least one insert pin 96a can be placed into the molding tool 88a. In certain examples, a plurality of flexible insert pins 96a may be inserted into the molding to form a plurality of curved alignment bores 74. In certain examples, the flexible insert pins 96a can each include a tapered portion 98 and a straight portion 100, although alternatives are possible. In certain examples, the insert pins 96a may include rounded or conical shaped tips. The shaped tips can allow the insert pins 96a to enter the mold even if slightly offset.

The flexible insert pins 96a can be configured as straight pins that have flexible characteristics that allow the flexible insert pins 96a to bend while inside the mold. That is, upon insertion, the flexible insert pins 96a can be curved or bent within the molding tool 88a. In certain examples, the flexible insert pins 96a can have a predefined curvature, although alternatives are possible.

In certain examples, the flexible insert pins 96a can be inserted into the molding tool 88a from opposing ends of the molding tool 88a such that opposing insert pins 96a interface at the meeting location 102. In certain examples, the meeting location 102 can be offset from the intermediate region 76a, although alternatives are possible.

Once the flexible insert pins 96a are inserted into the molding tool 88a, the molding tool 88a can cause the flexible insert pins 96a to bend. In certain examples, the flexible insert pins 96a themselves may be bent or have a bent configuration. A resin polymer can be injected into the molding tool 88a such that the resin polymer fully encircles the flexible insert pins 96a to form a molded article, i.e., the alignment body 68a.

In certain examples, angled guide elements may be formed in the molding tool 88a to help guide and angle the flexible insert pins 96a into the molding tool 88a such that the flexible insert pins 96a are bent slightly to form the first and second curved portions 78a, 80a. The angled guide elements may have a slope that is about 2/10ths of a degree, although alternatives are possible.

After the resin polymer has cured, the molded article (i.e., alignment body 68a) can be removed from the molding tool 88a. Likewise, because the flexible insert pins 96a are flexible, the flexible insert pins 96a can be pulled out of the molded article. Curved alignment bores 74 corresponding to the curvature of the flexible insert pins 96a can be defined in the alignment body 68a. Thus, the alignment body 68a includes the first and second curved portions 78a, 80a. The first and second curved portions 78a, 80a can be located on opposite sides of the intermediate region 76. The first and second curved portions 78a, 80a are symmetrical.

Each one of the first and second curved portions 78a, 80a of the alignment bore 74 can define first and second curved passages 82a, 84a. It will be appreciated that the curve of the first and second curved passages 82a, 84a appear exaggerated to make visible, but would otherwise be invisible to the naked eye. In certain examples, the curvature of the first and second curved portions 78a, 80a can result in an offset that ranges from about 2 microns to about 5 microns from a nominal centerline axis 118 of the alignment bore 74, although alternatives are possible.

In certain examples, the first and second curved passages 82a, 84a can extend along the fiber insertion axis 86 between the first and second ends 70, 72 of the alignment body 68a to receive first and second optical fibers 54a, 54b, respectively.

Upon insertion of the first and second optical fibers 54a, 54b into the first and second curved portions 78a, 80a, the first and second curved portions 78a, 80a can cause tips of the first and second optical fibers 54a, 54b to be biased toward one side of the alignment bore 74. That is, curves formed in the first and second curved portions 78a, 80a can enable the first and second curved portions 78a, 80a to correspondingly bend the inserted first and second optical fibers 54a, 54b. Thus, when the first and second optical fibers 54a, 54b are inserted in the alignment bore 74 defined by the alignment body 68a, the first and second optical fibers 54a, 54b are urged into the intermediate region 76a and the tips of the first and second optical fibers 54a, 54b are biased to one side of the alignment bore 74.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A fiber alignment device comprising:
   a one piece alignment body having a first end and an opposite second end;
   an alignment bore extending between the first and second ends of the one piece alignment body, wherein the one piece alignment body defines and fully encircles the alignment bore; and
   an intermediate region positioned between the first and second ends of the one piece alignment body;
   the alignment bore having first and second curved portions located on opposite sides of the intermediate region;
   wherein the alignment bore has a diameter of no more than 1.5 microns larger than a maximum outer diameter of an optical fiber.

2. The fiber alignment device of claim 1, wherein the first and second curved portions are symmetrical.

3. The fiber alignment device of claim 1, wherein the intermediate region includes a fiber contact location.

4. The fiber alignment device of claim 3, wherein the first and second curved portions of the alignment bore define first and second curved passages that extend along a fiber insertion axis between the first and second ends of the one piece alignment body to receive first and second optical fibers.

5. The fiber alignment device of claim 4, wherein upon insertion of the first and second optical fibers into the first and second curved passages, the first and second curved portions cause the first and second optical fibers to be biased toward one side of the alignment bore.

6. The fiber alignment device of claim 5, wherein ends of the first and second optical fibers meet at the fiber contact location of the intermediate region.

7. The fiber alignment device of claim 1, wherein the alignment bore has a diameter of no more than 1.0 microns larger than a maximum outer diameter of an optical fiber.

8. The fiber alignment device of claim 1, wherein the alignment bore has a diameter of no more than 0.5 microns larger than a maximum outer diameter of an optical fiber.

9. The fiber alignment device of claim 1, wherein the alignment bore has a diameter of 125.5 to 126.5 microns.

10. A multi-fiber alignment device comprising:
  a one piece alignment body having a first end and an opposite second end;
  a plurality of alignment bores extending between the first and second ends of the one piece alignment body, wherein the one piece alignment body defines and fully encircles each one of the plurality of alignment bores; and
  an intermediate region positioned between the first and second ends of the one piece alignment body;
  each one of the plurality of alignment bores having first and second curved portions located on opposite sides of the intermediate region;
  wherein each one of the plurality of alignment bores has a diameter of no more than 1.5 microns larger than a maximum outer diameter of an optical fiber.

11. The multi-fiber alignment device of claim 10, wherein each one of the first and second curved portions of the plurality of alignment bores are symmetrical.

12. The multi-fiber alignment device of claim 10, wherein the intermediate region includes a fiber contact location.

13. The multi-fiber alignment device of claim 12, wherein each one of the first and second curved portions of the plurality of alignment bores define first and second curved passages that extend along a fiber insertion axis between the first and second ends of the one piece alignment body to receive first and second optical fibers.

14. The multi-fiber alignment device of claim 13, wherein upon insertion of each of the first and second optical fibers into each of the first and second curved passages, the first and second curved portions cause the first and second optical fibers to be biased toward one side of the respective alignment bore.

15. The multi-fiber alignment device of claim 14, wherein ends of the first and second optical fibers meet at the fiber contact location of the intermediate region.

16. The multi-fiber alignment device of claim 10, wherein each one of the plurality of alignment bores has a diameter of no more than 1.0 microns larger than a maximum outer diameter of an optical fiber.

17. The multi-fiber alignment device of claim 10, wherein each one of the plurality of alignment bores has a diameter of no more than 0.5 microns larger than a maximum outer diameter of an optical fiber.

18. The multi-fiber alignment device of claim 10, wherein each one of the plurality of alignment bores has a diameter of 125.5 to 126.5 microns.

19. A fiber alignment device comprising:
  a one piece alignment body having a first end and an opposite second end;
  an alignment bore extending between the first and second ends of the one piece alignment body, wherein the one piece alignment body defines and fully encircles the alignment bore;
  an intermediate region positioned between the first and second ends of the one piece alignment body; and
  a cutout feature defined in a bottom surface of the one piece alignment body, the cutout feature defining the alignment bore with a varying wall thickness, the varying wall thickness being configured for providing differential cooling during processing;
  the alignment bore having first and second curved portions located on opposite sides of the intermediate region.

* * * * *